United States Patent [19]
Goyette

[11] 3,745,451
[45] July 10, 1973

[54] SYSTEM FOR DETECTING FAULTS IN TWISTED WIRES BY SENSING VARIATIONS IN $\mu$

[75] Inventor: Fernand Goyette, Longueuil, Quebec, Canada

[73] Assignee: Northern Electric Company Limited, Montreal, Canada

[22] Filed: Mar. 6, 1972

[21] Appl. No.: 232,064

[52] U.S. Cl............................ 324/51, 57/81, 324/37
[51] Int. Cl............................................. G01r 31/02
[58] Field of Search .................... 324/51, 52, 54, 37; 57/81

[56] References Cited
UNITED STATES PATENTS
2,326,344  8/1943  Elmendorf et al........ 324/34 OS UX
2,807,720  9/1957  Charles...................... 324/34 O UX FOREIGN PATENTS OR APPLICATIONS
596,182  12/1947  Great Britain...................... 324/37

Primary Examiner—Gerard R. Strecker
Attorney—Sidney T. Jelly

[57] ABSTRACT

A detector for faults in twisted wires, the detector in the form of a coil or other sensing device positioned adjacent the twisted wires and sensitive to variations in the $\mu$ of the wires. The sensing device is connected to an amplifying and detecting circuit arranged to react to an abrupt change in the amplitude of the signal from the sensing device.

3 Claims, 4 Drawing Figures

… … …

SYSTEM FOR DETECTING FAULTS IN TWISTED WIRES BY SENSING VARIATIONS IN $\mu$

This invention relates to the detection of faults in twisted wires, and in particular to detecting a break in one of a multiple of wires, or some other fault which affects the quality of the final product.

In producing twisted wires and particularly insulated wires, it is difficult to detect a break in one of the wires. This is expecially so in the relatively fine wires such as used for flexible leads for telephones and similar items. For safety and other reasons, the wires are twisted inside a closed cabinet, the wires lead from bobbins or coils in the cabinet, the wires passing up through a rotating tube by means of which the wires are twisted. The twisted wires issue from the cabinet to be wound up on a spool.

It is extremely difficult to position any detector in the cabinet and sensitive to all wires. It has been proposed to position a detector for each wire in the cabinet -sensitive to the tension in the wire and to bring out signals from the detectors. However it is necessary for the dectectors to rotate with the tube and wires; brushes and sliprings would be necessary for electrical signals, and other complicated connections for hydraulic or pneumatic systems. Such connections are upset by fluff and other dirt created in the cabinet. Even when operating satisfactorily such detectors only indicate a break and do not indicate other faults such as bad joints.

The present invention provides a detector which is sensitive to breaks, twisted joints and badly brazed joints. The device can be made insensitive to changes in wire diameter and to the presence of dirt etc. In addition to detecting a fault, the invention can be applied to the automatic control of the apparatus in that either indication of a fault, or stoppage of the apparatus on occurrance of a fault can be provided. By faults is meant, for example, breaks in a wire, bad joints, and run-out of a wire as when a spool becomes empty.

The detector comprises a sensing device for positioning adjacent the twisted wire and sensitive to variations in the $\mu$ of the wire and an electronic circuit for amplifying the signals from the sensing device and arranged to react to an abrupt change in the amplitude of the signal.

The invention will be understood by the following description of one embodiment, by way of example only, in conjunction with the accompanying drawings, in which.

Figure 1:
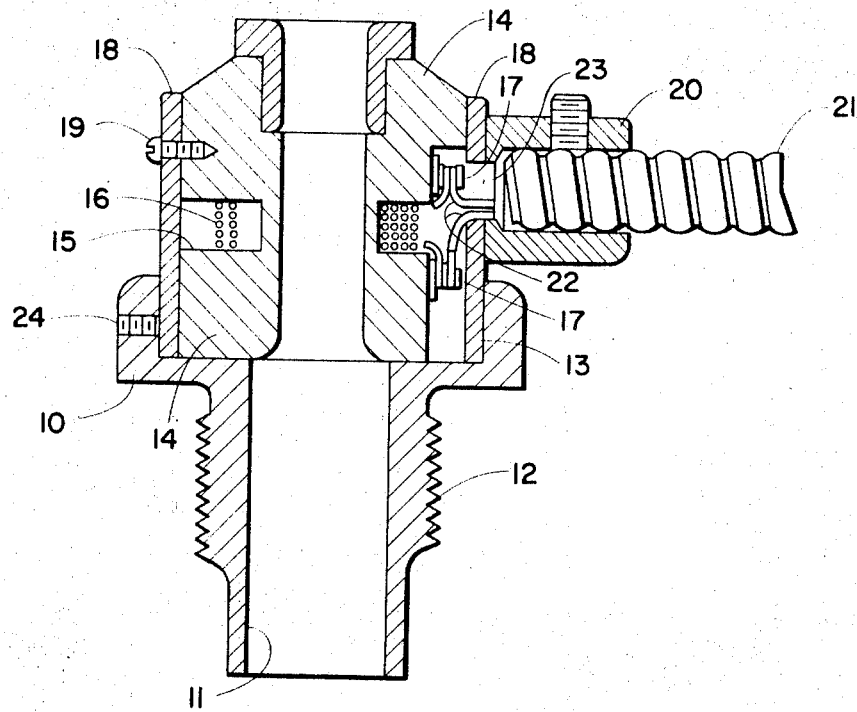
FIG. 1 is a cross-section through one form of sensing head.

In the particular embodiment now described the sensing device is in the form of a coil. The coil is positioned at a convenient point in the path of a twisted wire, for example, at the exit from the twisting machine. FIG. 1 is a cross-section through a sensing device arranged for attachment to the casing of a machine. The device comprises a base member 10 having a bore 11 therethrough and threaded at one end 12 for insertion in a similarly threaded hole in the machine casing. The base member is recessed at 13 at its end remote from the threaded portion 12 for the reception of a coil form 14. The coil form has an annular recess 15 formed intermediate its ends and a coil 16 is wound in this recess. The ends of the coil are taken out to terminals 17. A sleeve 18 extends round the coil form 14 and is attached thereto by screws 19. A tubular spigot 20 is brazed to the sleeve 18 and acts to hold the end of the flexible casing 21 of a connecting cable. The conductors 22 of the cable are carried through a hole 23 in the sleeve 14 and attached to the terminals 17. The coil form 14 and sleeve 18 are retained in the recessed portion 13 of the base member 10 by screws 24. A bush 25 of wear resistant material is pressed into the end of the coil form 14 remote from the body member 10.

Figure 2:
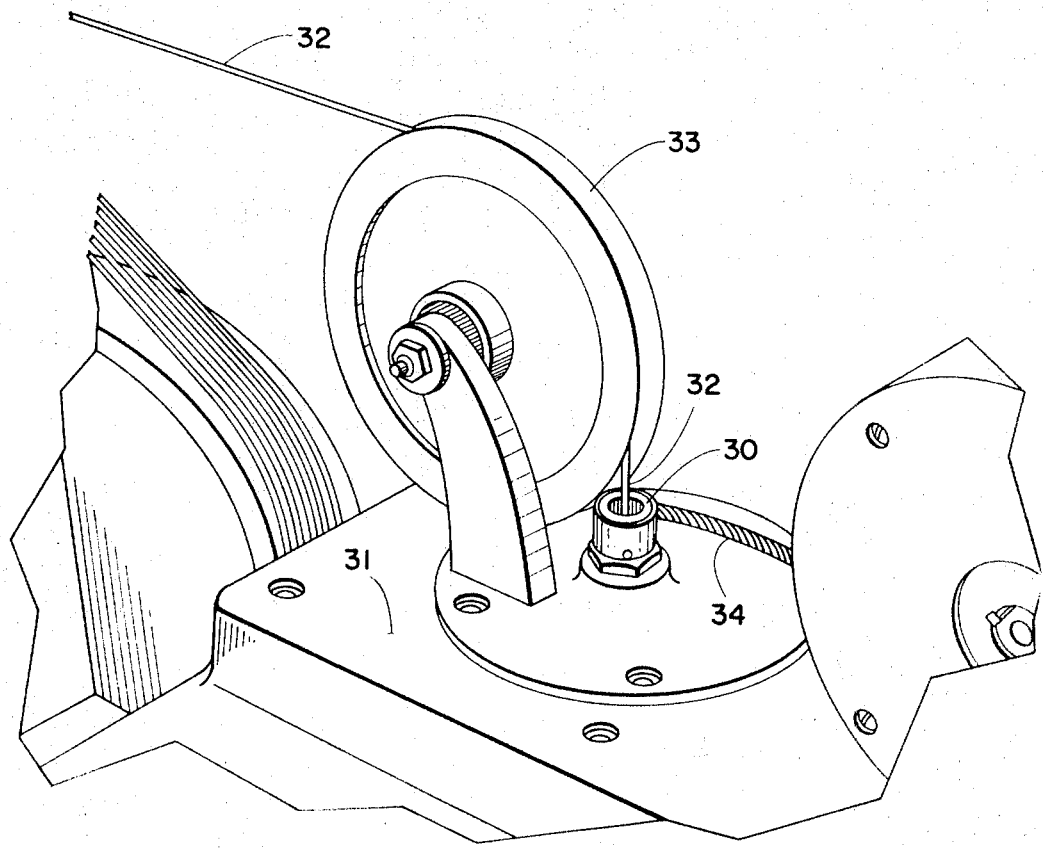
FIG. 2 is a perspective view of the sensing head of FIG. 1 installed on a twisting machine.

The sensing device can be positioned wherever it is convenient but the particular arrangement of FIG. 1 is particularly suited to positioning at the outlet of the twisted wire, from the twisting machine casing. FIG. 2 illustrates such an arrangement, the sensing device shown generally at 30 and being screwed into a threaded hole in the top casing 31 of the wire twisting machine. This hole is the normal exit hole for the twisted wire, a wear resistant bush normally being screwed into the hole. The twisted wire 32 exits through the device 30 and over a pulley 33 onto a take up spool. The cable connecting the sensing device to a control circuit is seen at 34.

Figure 3:
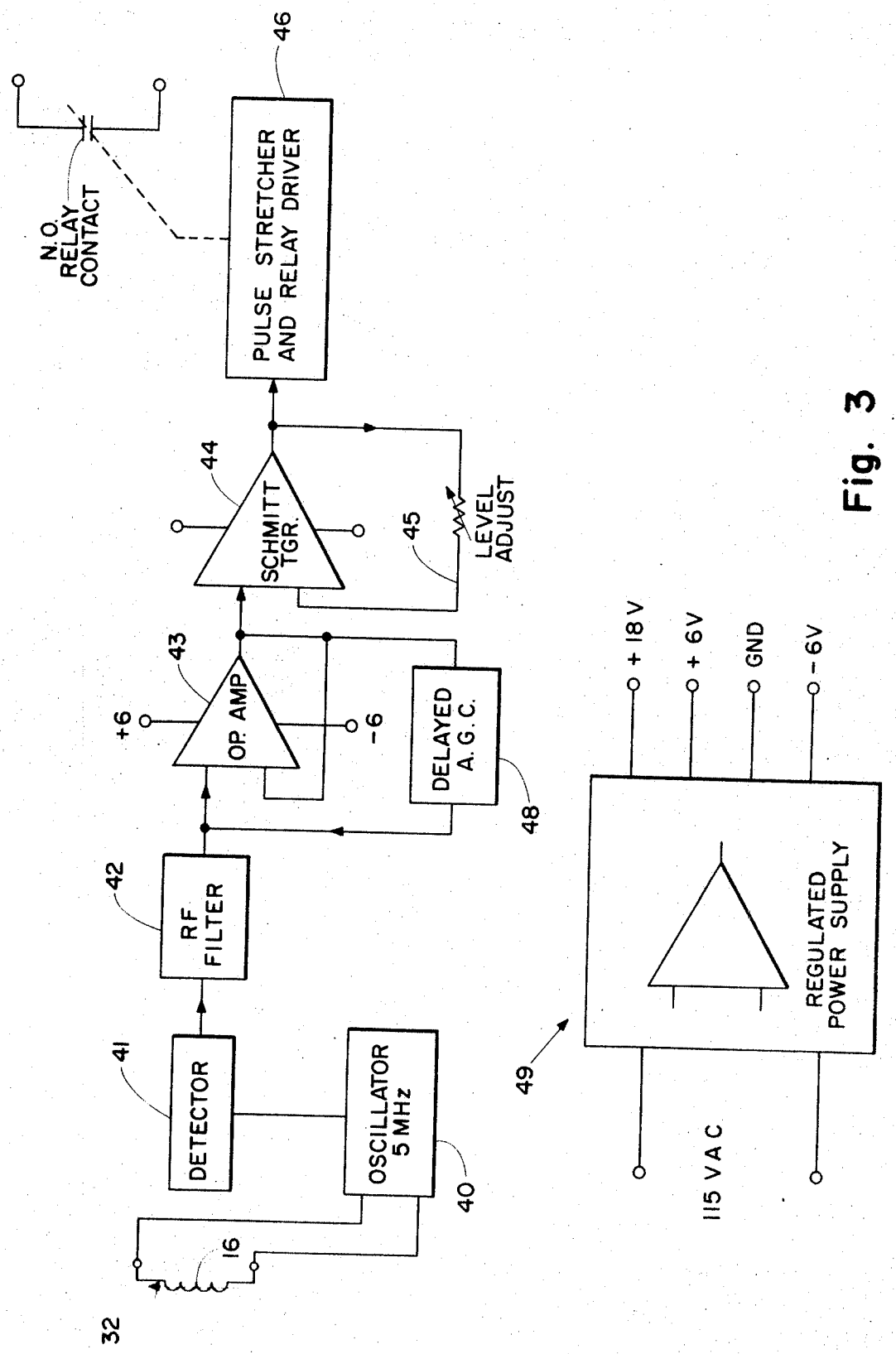
FIG. 3 is a block diagram of one circuit for the sensing device.

FIG. 3 is a block diagram of one control circuit for use with the device of FIG. 1. The coil 16 is indicated, and also the twisted wire 32, the direction of travel as shown. The coil is connected to a 0.5 MHz oscillator 40 to which is also connected a detector 41. The output from the detector 40 is fed to an RF filter 42 and then to an amplifier 43. The output from the amplifier 43 is fed to a Schmitt trigger 44, having a level adjust 45. The Schmitt trigger fixes at a value corresponding to a predetermined change in amplitude of the signal. The output from the Schmitt trigger 44 is fed to pulse stretcher and relay driver 46 which controls the driver motor via relay 47. The pulse stretcher stretches the output pulse from the Schmitt trigger 44. Typically the output pulse from the Schmitt trigger is a 5 milisecond pulse and this is too short to operate the relay. The pulse stretcher 46 stretches the pulse to one of 500 miliseconds, for example. This is long enought to cause the relay contacts to close and to hold them closed long enough to break the contacts in the machine control.

Positioned across the amplifier 43 is a delayed gain control 48, the opertion of which will be described later. The various units of the circuit are supplied by a regulated power supply 49.

Figure 4:
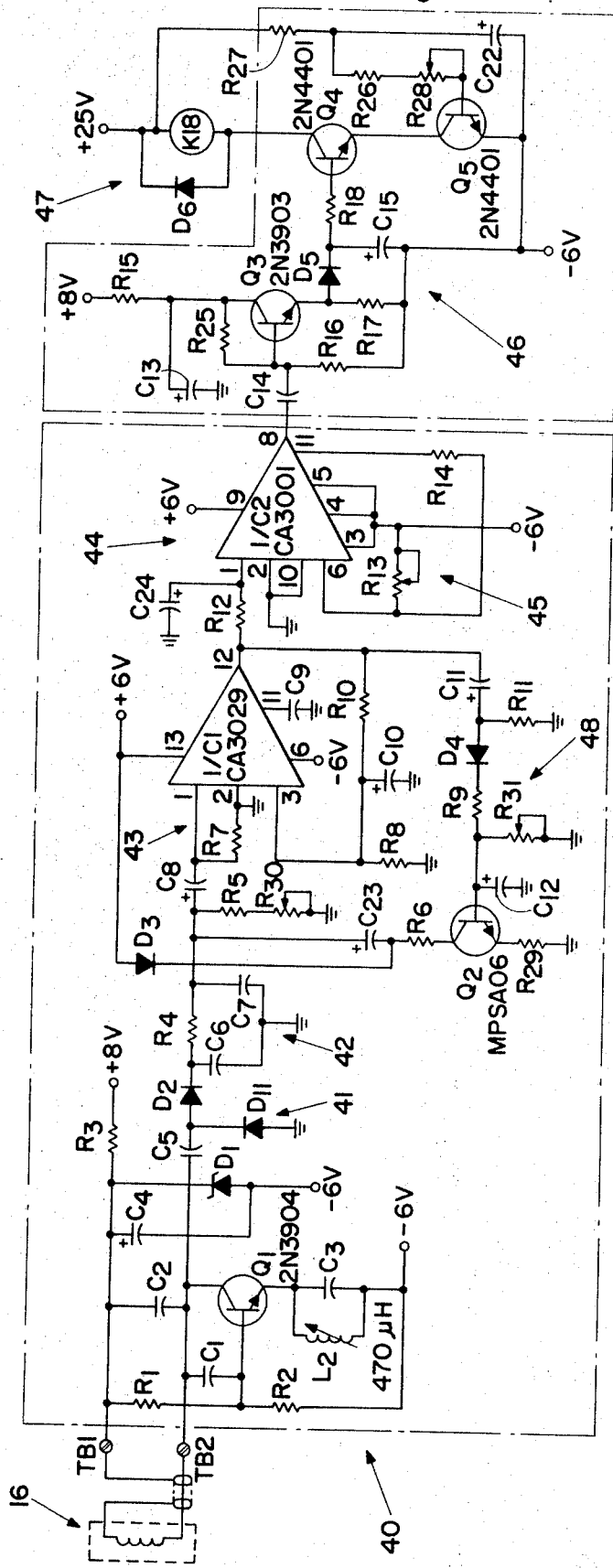
FIG. 4 is the circuit of FIG. 3 in more detail.

FIG. 4 is a more detailed circuit diagram for the control circuit of FIG. 3. The individual units, and individual elements of the units, are of normal and well known form and do not require describing in detail. The coil is shown at 16, the detector at 40 and the oscillator at 41, 42 indicates the RF filter; 43 the amplifier with the delayed gain control 48; 44 is the Schmitt trigger with the lever adjust 45; and 46 is the pulse stretcher and relay driver.

In operation the wire is fed through the coil of the sensing device, the wire having a particular value for $\mu$. There are two effects on the travel of the wire through the coil, one a substantially constant one and the other occurring only when a fault is present. Both effects produce a signal. The first effect is caused by the vibration of the wire as its passes through the coil. This vibration produces small amplitude modulations on the output of the oscillator 40. The second effect occurs when there is something to cause a change in the value for $\mu$, either a permanent or short term change. A permanent change for example is when a wire breaks and therefore the final twisted wire is short one strand. Another permanent change is on run out, that is when one or more spools in the twisting machine becomes empty. Examples of short time changes are overlapping brazed joints and twisted joints.

Also shown in the circuit of FIG. 4 is a sub-circuit 50 which provides for a 5 to 15 second delay. This is not a necessary sub-circuit and is provided in the present example to permit the joining of the ends of wires from one set of reels to the beginnings of wires from a new set of reels. Thus when the wires from two reels in the machine cabinet are twisted together and the reels become emptied, the machine is stopped while two new reels are placed into the machine replacing the empty reels. In this instant the new wires and old wires are joined by tying them together with a knot. When the machine is restarted this knot would actuate the fault relay to stop the machine. By means of the delay sub-circuit 50 the relay 47 is held inoperative for a sufficient length of time for the knot to have passed up through the coil 16.

In a constant $\mu$ condition the change in amplitude of the main signal on occurrence of a fault is considerably greater than the change in amplitude due to the signal arising from the wire vibration and the control circuit detects this change in amplitude, whether on a permanent or short term basis, and actuates a relay or equivalent to stop the machine.

The delay gain control 48 is influenced by the average amplitude of the signal to the amplifier 43, but on a time delay basis. Thus it is affected only slowly and only adjusts the gain of the amplifier when a relatively slow change in amplitude occurs. Such a change can occur when a steady signal is produced by the vibration of the wire in the bore of the coil. A more sudden change will occur with a change in the size of wires being twisted and/or the number of wires being twisted. On changing the size and/or number of wires, the gain control will vary the gain of the amplifier to bring the signal output from the amplifier back to a datum level. Such variation can be to increase or decrese the amplifier gain.

The delayed gain control ensures effective operation of the device independent of the wire size. It has been found that the variation in amplitude arising from the vibration of two 22swg wires twisted together can be the same as the variation in amplitude resulting in a break of one of two 26swg wires, if no adjustment is made in the amplifier gain to offset the differences in the basic signal amplitude arising from the different $\mu$'s for the different wire sizes. Without the delayed gain control it would be necessary to recalibrate the device for each different gauge and/or number of wires.

Therefore, it will be seen that by using an abrupt amplitude change of a signal of $\mu$ change, other effects which might cause a long term amplitude change are ignored. The provision of a delayed automatic gain control for the amplifier makes the device self calibrating.

In a particular aspect of the application of the invention, monitoring the twisting of wires for telephone cords, two insulated wires are twisted together. It is important, for economy reasons, that the machine be stopped if one of the wires breaks, or a spool becomes empty. It is also desirable that lengths of a conductor, when joined, should be joined by butt brazing. If an overlapped braze is used this is detected and the machine stopped. Sometimes it occurs that instead of the conductors being brazed the two ends are merely twisted together. This is unacceptable and again is detected and the machine stopped. In runs with apparatus in accordance with the invention, breaks, run-outs, overlapped brazed joints and twisted joints were detected but correctly brazed joints were undetected.

Although the invention has been described in an embodiment in which detection of a fault stops a machine, it will be appreciated, that if desired, instead of the machine being stopped, an indication of the occurrence of a fault can be registered instead. In certain uses of the invention the indication of the number of faults, and possibly also an indication of the locality of the faults, can be sufficient.

What is claimed is:

1. In a machine for twisting together at least two wires, apparatus for detecting faults in said wires and adapted to stop said machine on occurrence of a fault, said apparatus comprising a coil positioned at an outlet position of said machine, said wires arranged to pass through said coil, said coil sensitive to variations in the $\mu$ of said wires; a relay controlling the power supply to said machine; an electronic circuit for receiving signals from said coil; said electronic circuit comprising: an electronic oscillator, the amplitude of oscillations varied by variations in the $\mu$ of said wires, and a detector responsive to oscillations from said oscillator to produce an output signal; an amplifier for amplifying signals in said electronic circuit; a delayed gain control for said amplifier, said gain control responsive to long term variations in oscillation amplitude to adjust the amplifier output to a predetermined level and non-responsive to abrupt changes in oscillation amplitude; means for producing an output pulse on occurrence of said abrupt change in oscillation amplitude; and means for feeding said pulse to said relay.

2. In a machine as claimed in claim 1, means for stretching said output pulse.

3. In a machine as claimed in claim 2, time delay means connected between said pulse stretching means and said relay, said time delay means arranged to be actuated on starting of said machine and to prevent actuation of said relay by an output pulse for a predetermined period of time.

* * * * *